(12) United States Patent
Schuknecht et al.

(10) Patent No.: US 12,395,117 B2
(45) Date of Patent: Aug. 19, 2025

(54) PHOTOVOLTAIC MODULE MOUNT

(71) Applicant: ARRAY TECH, INC., Albuquerque, NM (US)

(72) Inventors: Nathan Schuknecht, Golden, CO (US); Benjamin C. de Fresart, Chandler, AZ (US)

(73) Assignee: ARRAY TECH, INC., Albuquerque, NM (US)

( * ) Notice: Subject to any disclaimer, the term of this patent is extended or adjusted under 35 U.S.C. 154(b) by 0 days.

(21) Appl. No.: 18/773,352

(22) Filed: Jul. 15, 2024

(65) Prior Publication Data

US 2024/0372507 A1 Nov. 7, 2024

Related U.S. Application Data

(63) Continuation of application No. 17/816,692, filed on Aug. 1, 2022, now Pat. No. 12,074,559.

(51) Int. Cl.
*H02S 20/32* (2014.01)
*B23P 13/02* (2006.01)

(52) U.S. Cl.
CPC .............. *H02S 20/32* (2014.12); *B23P 13/02* (2013.01)

(58) Field of Classification Search
CPC .......... B23P 13/02; H02S 20/32; H02S 20/00; F24S 30/425; F24S 25/636; F24S 2025/6003; Y02E 10/47; Y02E 10/50
See application file for complete search history.

(56) References Cited

U.S. PATENT DOCUMENTS

| | | | |
|---|---|---|---|
| 9,276,521 B2 * | 3/2016 | Reed | F24S 25/65 |
| 9,395,104 B2 * | 7/2016 | Grushkowitz | F24S 25/65 |
| 9,905,717 B2 | 2/2018 | Au | |
| 9,923,510 B2 | 3/2018 | Au | |
| 10,008,975 B2 | 6/2018 | Au | |
| 10,069,455 B2 * | 9/2018 | Corio | F24S 25/634 |
| 10,298,172 B2 * | 5/2019 | Oh | F24S 25/632 |
| 10,333,459 B2 * | 6/2019 | Oh | H02S 30/10 |
| 10,443,895 B1 * | 10/2019 | Cherukupalli | F24S 30/425 |
| 10,998,849 B2 | 5/2021 | Au | |
| 11,271,518 B2 * | 3/2022 | Ballentine | H02S 30/00 |
| D956,537 S * | 7/2022 | Schuknecht | D8/373 |

(Continued)

OTHER PUBLICATIONS

International Search Report and Written Opinion mailed Nov. 13, 2023, in related PCT App. No. PCT/US2023/029236, 12 pgs.

*Primary Examiner* — Patrick D Hawn
(74) *Attorney, Agent, or Firm* — MASCHOFF BRENNAN

(57) ABSTRACT

A photovoltaic module mounting system may include a module clamp that includes a central section that includes two first walls connected at the top of each first wall by a first connecting surface. The central section may have a first cross-sectional height corresponding to a height of each of the first walls and a first width corresponding to a distance between the two first walls. The module clamp may have ends that include two second walls connected at the top of each second wall by a second connecting surface in which each of the ends has a second cross-sectional height that is shorter than the first cross-sectional height and a second width that is wider than the first width. The central section may be connected to each of the ends such that the first connecting surface and the second connecting surface are bridged and form a bowtie shape.

20 Claims, 8 Drawing Sheets

(56) References Cited

U.S. PATENT DOCUMENTS

| | | | | |
|---|---|---|---|---|
| 11,502,638 B2 * | 11/2022 | Watson | ............... | F24S 30/425 |
| 11,527,988 B2 * | 12/2022 | Schuknecht | ............ | H02S 30/00 |
| D974,888 S * | 1/2023 | Schuknecht | ................... | D8/373 |
| 11,569,780 B2 * | 1/2023 | Dally | .................... | F24S 30/425 |
| 11,962,269 B2 * | 4/2024 | Creasy | ................... | B21D 28/26 |
| 2011/0265860 A1 * | 11/2011 | Ciasulli | ................ | F24S 25/634 |
| | | | | 174/126.1 |
| 2014/0069877 A1 | 3/2014 | McPheeters | | |
| 2015/0200621 A1 | 7/2015 | Reed et al. | | |
| 2017/0310273 A1 * | 10/2017 | Almy | ................... | F24S 25/632 |
| 2020/0153382 A1 | 5/2020 | Ballentine et al. | | |
| 2020/0162016 A1 | 5/2020 | Corio | | |
| 2021/0194418 A1 * | 6/2021 | Ballentine | ............... | H02S 20/32 |
| 2022/0271707 A1 * | 8/2022 | Reynolds | ............... | H02S 30/10 |
| 2022/0407451 A1 * | 12/2022 | Jacobs | ................... | H02S 20/20 |
| 2023/0188086 A1 * | 6/2023 | Garza | .................... | H02S 30/10 |
| | | | | 136/244 |
| 2023/0246589 A1 * | 8/2023 | Morankar | ............... | H02S 30/00 |
| | | | | 248/475.1 |
| 2023/0327603 A1 * | 10/2023 | Taha | ....................... | H02S 30/00 |
| | | | | 136/244 |
| 2023/0402963 A1 * | 12/2023 | Yadlapalli | ............... | F24S 25/63 |

\* cited by examiner

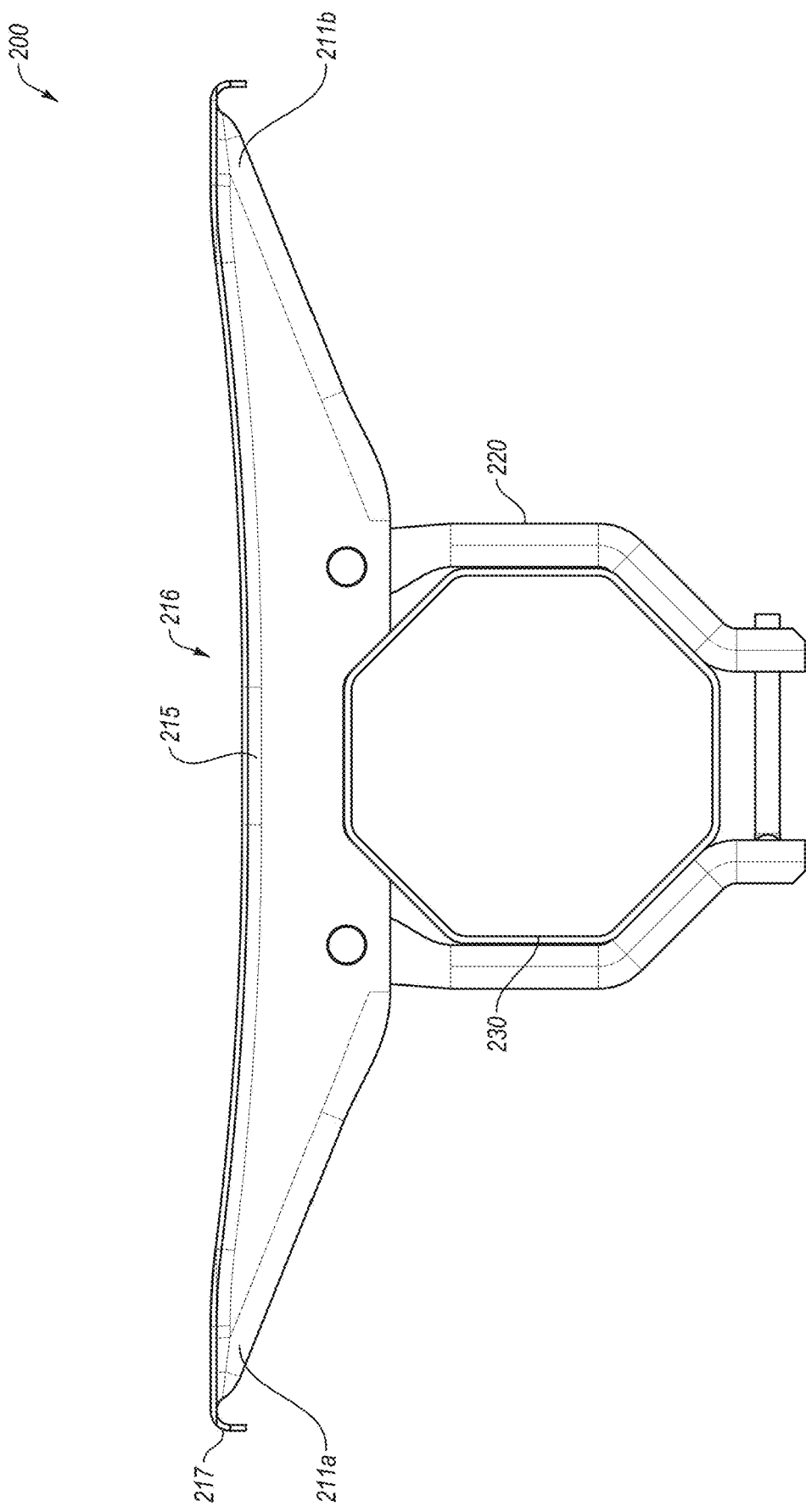

PHOTOVOLTAIC MODULE MOUNT

CROSS-REFERENCE TO RELATED APPLICATION

This application claims the benefit of U.S. patent application Ser. No. 17/816,692, filed on Aug. 1, 2022, which is incorporated herein by reference in its entirety.

TECHNICAL FIELD

The present disclosure generally relates to a photovoltaic module mount and a method of manufacturing the photovoltaic module mount.

BACKGROUND

Systems of solar panels may include one or more photovoltaic (PV) modules that convert sunlight into electrical power. The PV modules may be mounted in rows on solar trackers that direct an orientation of the PV modules such that the orientation of the PV modules changes throughout a day. For example, a series of piles may be disposed into the ground and may support a torque tube to which the PV modules are coupled. The PV modules may be coupled to the torque tube using a clamp, bolts (such as a U-bolt), or other coupling technique. As the torque tube is rotated under the direction of a solar tracker, the attached PV modules rotate in a corresponding manner such that by changing the orientation of the torque tube, the PV modules are able to track the location of the sun throughout the day.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a photovoltaic module mounting system that may include a module clamp that includes a central section that includes two first walls connected at the top of each first wall by a first connecting surface. The central section may have a first cross-sectional height corresponding to a height of each of the first walls and a first width corresponding to a distance between the two first walls. The module clamp may have ends that include two second walls connected at the top of each second wall by a second connecting surface in which each of the ends has a second cross-sectional height that is shorter than the first cross-sectional height and a second width that is wider than the first width. The central section may be connected to each of the ends such that the first connecting surface and the second connecting surface are bridged and form a bowtie shape.

One or more embodiments of the present disclosure may include a photovoltaic module mounting system in accordance with any of the other embodiments of the present disclosure where each of the ends includes one or more slots configured to be aligned with one or more openings of a photovoltaic module.

One or more embodiments of the present disclosure may include a photovoltaic module mounting system in accordance with any of the other embodiments of the present disclosure where the module clamp further includes one or more flanges extending generally horizontally from one or more of the first walls.

One or more embodiments of the present disclosure may include a photovoltaic module mounting system in accordance with any of the other embodiments of the present disclosure where the module clamp further includes one or more flanges extending generally horizontally from one or more of the ends.

One or more embodiments of the present disclosure may include a photovoltaic module mounting system in accordance with any of the other embodiments of the present disclosure where the module clamp further includes one or more tabs protruding from the connecting surface in a direction towards which a photovoltaic module interfaces with the module clamp.

One or more embodiments of the present disclosure may include a photovoltaic module mounting system in accordance with any of the other embodiments of the present disclosure where the module clamp is made of galvanized steel.

One or more embodiments of the present disclosure may include a photovoltaic module mounting system that may include a module clamp that includes a central section that includes two first walls connected at a top of each first wall by a first connecting surface. The central section may include a first cross-sectional height corresponding to a height of each of the first walls and a first width corresponding to a distance between the two first walls. The module clamp may include one or more ends that includes two second walls connected at a top of each second wall by a second connecting surface in which each of the ends has a second cross-sectional height that is shorter than the first cross-sectional height and a second width that is wider than the first width. The central section may be connected to each of the ends such that the first connecting surface and the second connecting surface are bridged and form a bowtie shape. The photovoltaic module mounting system may also include a torque tube band coupled to the module clamp.

One or more embodiments of the present disclosure may include a photovoltaic module mounting system in accordance with any of the other embodiments of the present disclosure where the channel includes a cutout section that extends at least partially along a length of the channel. In some embodiments, the cutout section may be wider in the central section and more narrow at either of the two ends.

One or more embodiments of the present disclosure may include a photovoltaic module mounting system in accordance with any of the other embodiments of the present disclosure where the module clamp includes pivot fasteners coupling the torque tube band to the module clamp, the pivot fasteners spanning the cutout section.

One or more embodiments of the present disclosure may include a photovoltaic module mounting system in accordance with any of the other embodiments of the present disclosure where the first end and the second end are each higher than the central section such that the mounting surface forms a bowed shape from the first end to the central section and from the central section to the second end.

One or more embodiments of the present disclosure may include a method that includes obtaining a metal sheet coil, and cutting out a generally rectangular patterned sheet from the metal sheet coil with length-sides and width-sides. The generally rectangular patterned sheet may include corresponding cutout portions on both of the length-sides, and the cutout portions may correspond to a profile of at least a portion of a torque tube. The method may also include forming the patterned sheet into a module clamp from the patterned sheet, where the module clamp may include a taller height in a central portion proximate the cutout portions than at ends of the module clamp, and the module clamp may include a width wider at the ends than at the central portion.

One or more embodiments of the present disclosure may include a method in accordance with any of the other methods of the present disclosure where the metal sheet coil is made of galvanized steel.

One or more embodiments of the present disclosure may include a method in accordance with any of the other methods of the present disclosure where the method may also include forming one or more slots in the ends of the module clamp, or in portions of the generally rectangular patterned sheet that correspond to the ends of the module clamp.

One or more embodiments of the present disclosure may include a method in accordance with any of the other methods of the present disclosure where the features formed on the module clamp may include one or more protruding tabs or one or more flanges formed along one or more surfaces of the module clamp.

One or more embodiments of the present disclosure may include a method in accordance with any of the other methods of the present disclosure where forming the module clamp from the patterned sheet may include positioning the patterned sheet against a contoured template block; and applying force to the patterned sheet so that the patterned sheet takes on a shape complementing the contoured template block.

One or more embodiments of the present disclosure may include a method in accordance with any of the other methods of the present disclosure where cutting out the patterned sheet from the metal sheet coil and forming the one or more slots in the patterned sheet may be performed simultaneously.

One or more embodiments of the present disclosure may include a method in accordance with any of the other methods of the present disclosure where cutting out the patterned sheet from the metal sheet coil and forming the one or more slots in the patterned sheet may be performed after forming the one or more slots in the patterned sheet.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 2C is a side view of the second example PV module mounting system of FIG. 2A, according to at least one embodiment of the present disclosure.

DETAILED DESCRIPTION

Figure 1A:
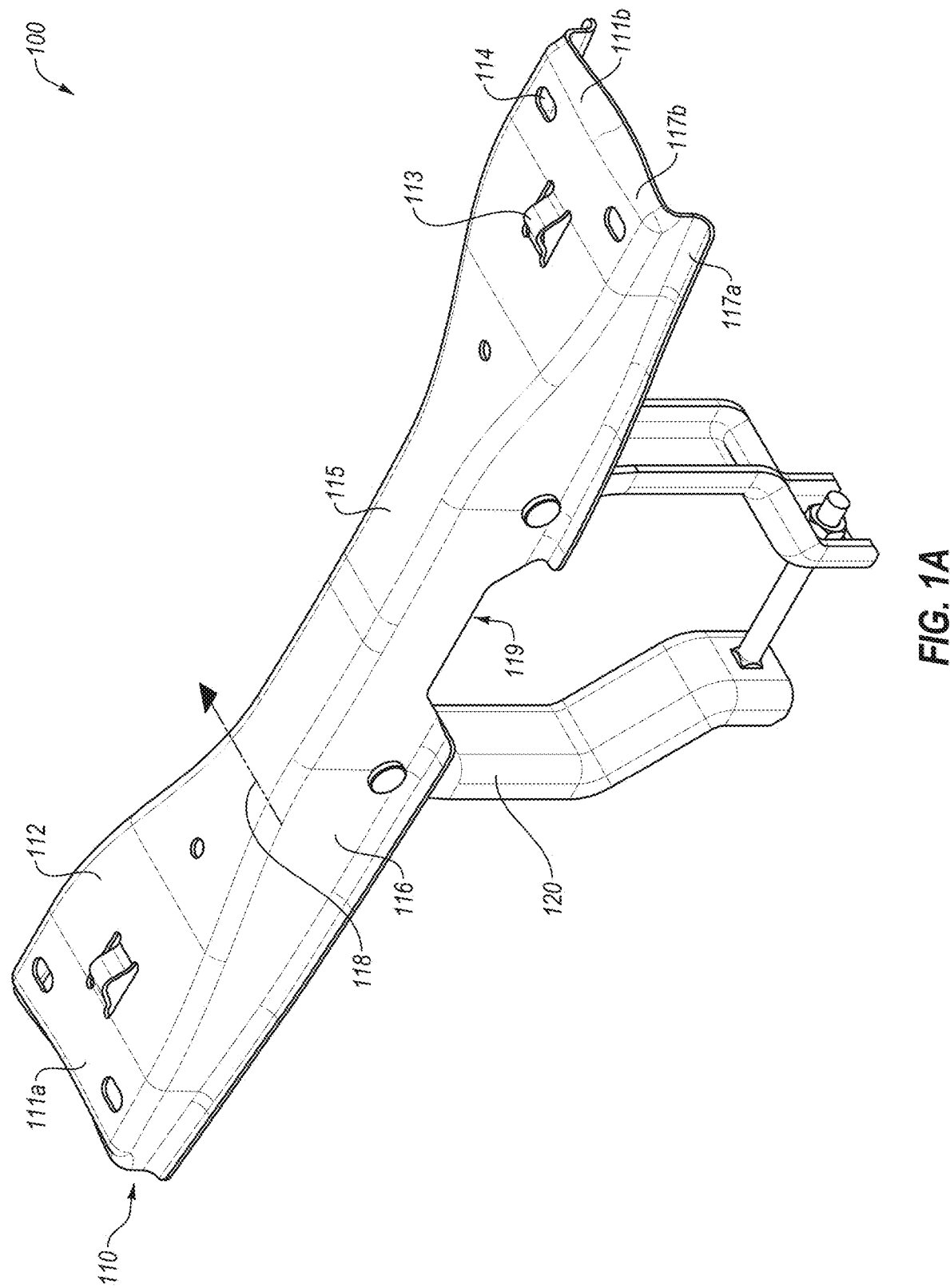
FIG. 1A is an isometric view of an example embodiment of a PV module mounting system, according to at least one embodiment of the present disclosure.

Different solar array sites may include varying environmental conditions, such as different wind speeds, rainfall levels, snowfall frequencies, other weather events, or some combination thereof. Depending on the weather events that affect a given solar array site, the pressure and stress experienced by photovoltaic (PV) modules at the given solar array site may greatly differ from the pressure and stress experienced by PV modules located at other solar array sites. Additionally, different manufacturers or suppliers of PV modules may have differing strengths and characteristics, such that even in the same location, the amount of pressure and/or stress that can be sustained by different PV modules can be observed. Also, different sizes of PV modules may experience different stresses. For example, a smaller-sized PV module may exert less stress on a support structure compared to a larger-sized PV module. PV module mounting assemblies may include different types of structures that are geared towards handling these different pressure levels. For example, low-pressure PV module mounting assemblies may include fewer structural features that facilitate withstanding high stress levels being exerted on the PV modules or the PV module mounting assemblies themselves. In comparison, PV module mounting assemblies designed for high-pressure environments may include features that improve resistance to high stress being exerted on the PV modules or the PV module mounting assemblies.

The present disclosure relates to, among other things, a PV module mounting system that is configured to be coupled with large format PV modules and/or with smaller format PV modules in higher stress situations (e.g., windy climates, climates with large amounts of snow, among others). In some embodiments, the PV module mounting system may include a taller cross-section towards a middle of the PV module mounting system and shorter cross-sections at the ends of the PV module mounting system corresponding to differences in the stress profile once the PV module mounting system is coupled to a module rail of a PV module. Additionally or alternatively, the PV module mounting system may include features that facilitate attachment of the module rail of the PV module to the PV module mounting system. For example, the PV module mounting system may include one or more protruding tabs at flared ends that facilitate spacing of gaps between PV modules. As another example, the PV module mounting system may include a lip or flange shape at one or more edges of the flared ends that stabilize openings in the flared ends configured to interface with bolts that couple the PV modules to the PV module mounting system. The above-mentioned features, along with various other factors, may facilitate usage of the PV module mounting system in high- or mid-pressure environments in which more robust PV module mounting features are used to withstand greater pressure loads but use of high-pressure components may be extraneous or too costly. Additionally or alternatively, such features may facilitate the use of thinner materials in low-pressure applications, thereby reducing the cost of materials used in the mounting of PV modules in such a circumstance.

The PV module mounting system may be manufactured at a lower cost than existing PV module mounting assemblies because the PV module mounting system according to the present disclosure may be made using fewer materials (or less material) than existing PV module mounting assemblies. Additionally or alternatively, the PV module mounting system may be formed using a progressive die stamping process that facilitates manufacturing the PV module mounting system with high throughput and at large production volumes. For example, the footprint of the metal component used in manufacturing may include a base rectangular shape that may significantly reduce the amount of wasted metal material which might otherwise occur in other shapes that provide for a taller cross-section towards a middle of the PV module mounting system.

Embodiments of the present disclosure are explained with reference to the accompanying figures.

Figure 1B:
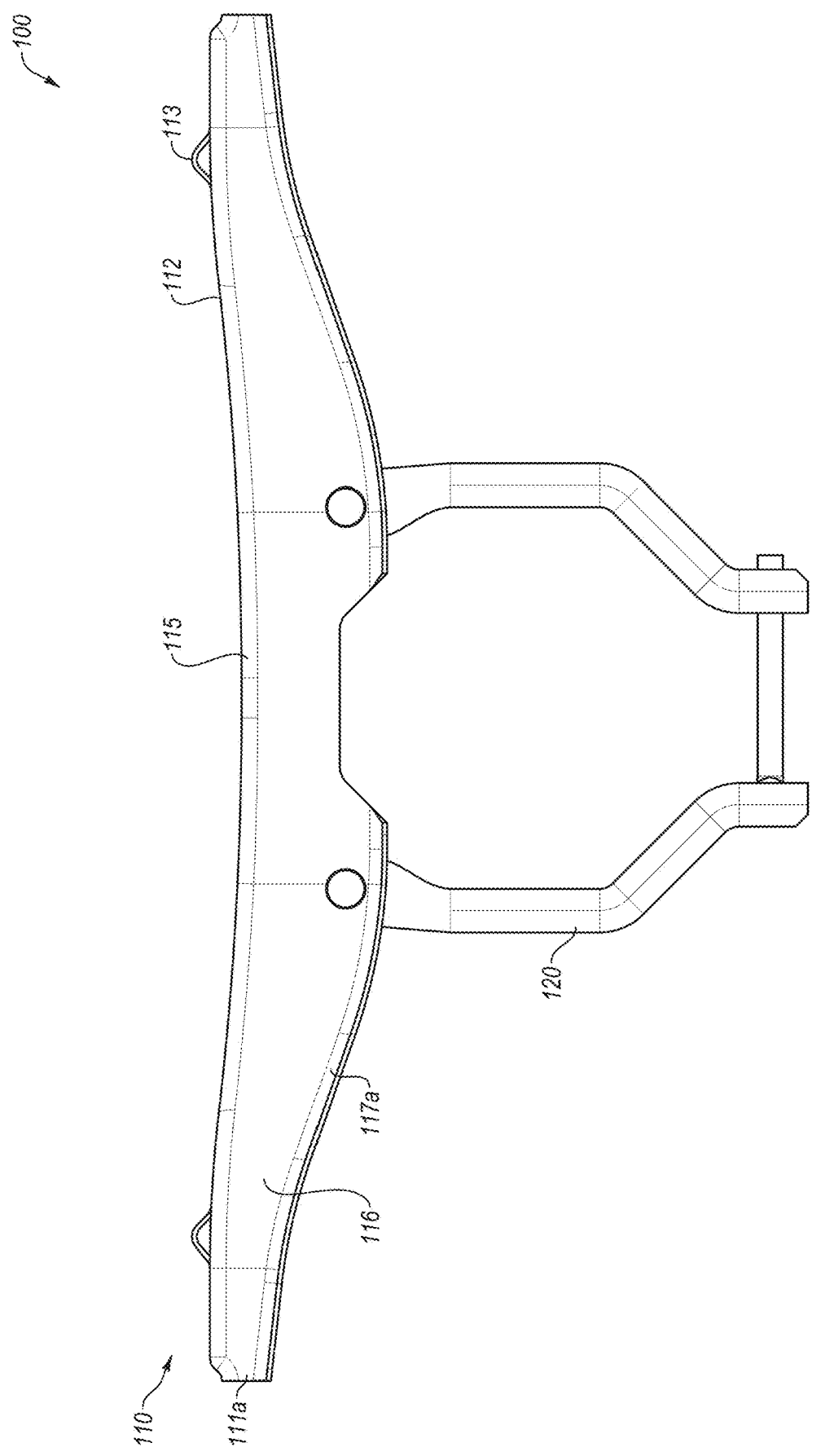
FIG. 1B is a front view of the example PV module mounting system of FIG. 1A, according to at least one embodiment of the present disclosure.
Figure 1C:
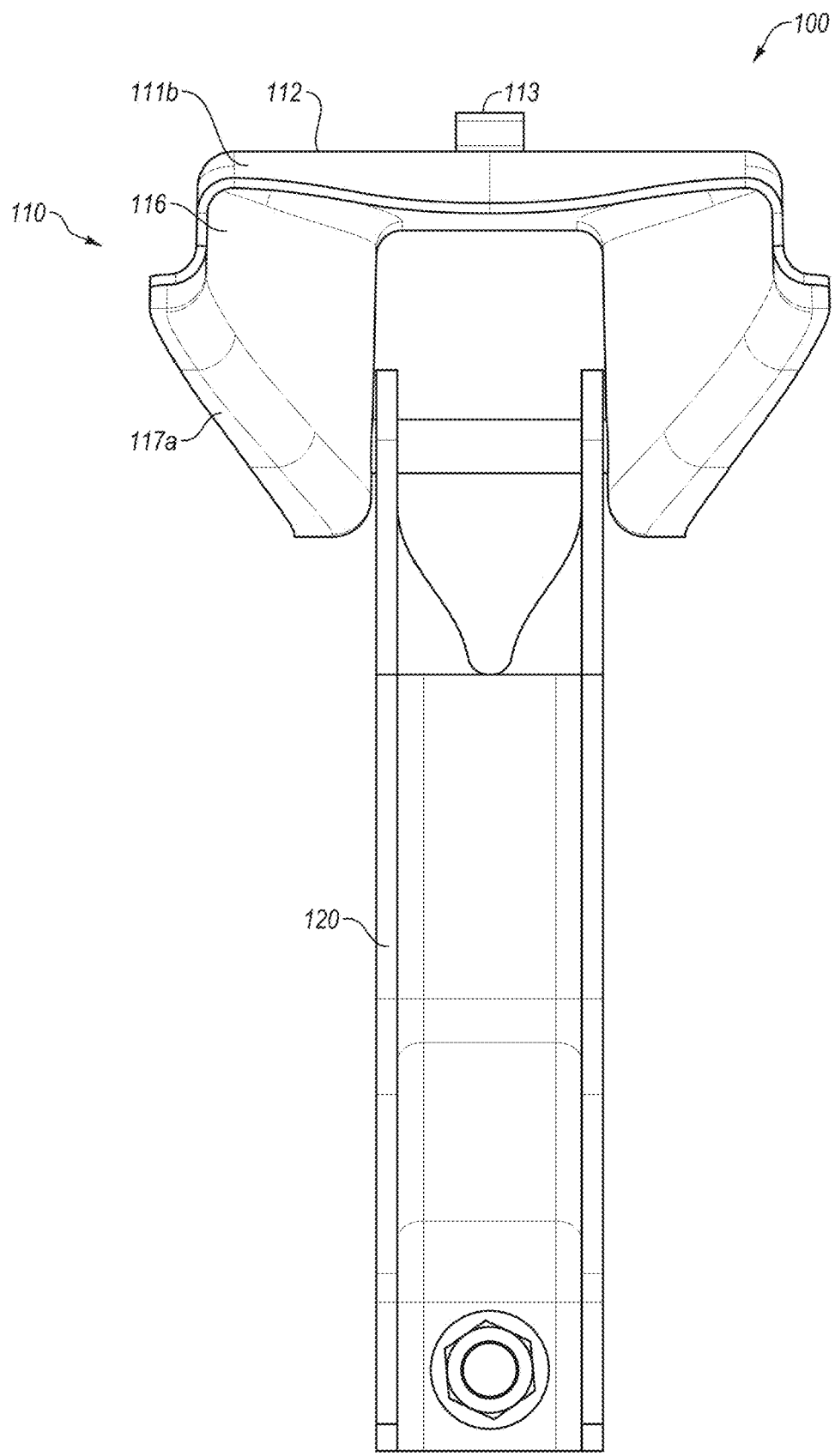
FIG. 1C is a side view of the example PV module mounting system of FIG. 1A, according to at least one embodiment of the present disclosure.

FIGS. 1A-1C illustrate different views of an example embodiment of a PV module mounting system 100 according to at least one embodiment of the present disclosure in which FIG. 1A shows an isometric view of the PV module mounting system 100. FIG. 1B is a front view of the PV module mounting system 100 according to at least one embodiment of the present disclosure, and FIG. 1C is a side view of the PV module mounting system 100 according to at least one embodiment of the present disclosure.

The PV module mounting system 100 may include a module clamp 110 on which a PV module (not shown) may be mounted. The module clamp 110 may be coupled to a torque tube band 120 that is configured to circumscribe a torque tube (not shown) in which rotation of the torque tube causes the torque tube band 120 to rotate accordingly. The rotation of the torque tube band 120 may result in a corresponding length-wise movement of the module clamp 110, which may in turn tilt the PV module mounted on the module clamp 110. In other words, the PV module mounting system 100 may be configured to control and/or adjust an orientation of a PV module mounted on the PV module mounting system 100, such as for solar tracking or stowing the PV module during inclement weather conditions, based on rotation of a torque tube to which the PV module mounting system 100 is coupled.

In some embodiments, the module clamp 110 may include a bow-tie shape in which one or more ends 111a and 111b (herein collectively referred to as "ends 111") of the module clamp 110 are wider than a central section 115 of the module clamp 110. Additionally or alternatively, the ends 111 of the module clamp 110 may be shorter than the central section 115 such that the central section 115 has a narrower but taller profile than either of the ends 111. Because the central section 115 of the module clamp 110 may experience more stress than either of the ends 111 when a PV module is mounted on the PV module mounting system 100, the taller cross-section of the central section 115 may cause the central section 115 to be more rigid in a vertical direction and capable of carrying stress from the weight of the PV module and/or other forces like wind or snow than the shorter and wider ends 111.

In these and other embodiments, either or both of the ends 111 may include one or more slots 114, holes, or other openings, that extend through the ends 111. The PV module may include one or more slots corresponding to the slots 114 of the module clamp 110 such that the PV module may be coupled to the module clamp 110 by aligning the slots, holes, or other openings of the PV module with the slots 114 and inserting a bolt, a nut, a screw, any other types of fasteners, or some combination thereof through the aligned slots. Although the module clamp 110 is illustrated as including two slots 114 at each end 111a and 111b, the module clamp 110 may include any number of slots 114. For example, each end 111a and 111b may include three, four, five, or more slots 114 oriented at varying angles and spacings to facilitate alignment between the slots 114 and the slots of different PV modules.

Additionally or alternatively, either or both of the ends 111 may include one or more tabs 113 that protrude from a top surface 112 of the ends 111. A PV module coupled to the module clamp 110 may butt up against the tabs 113 to provide appropriate spacing between adjacent PV modules. For example, the tabs 113 may provide spacing between the two adjacent PV modules such that they do not contact each other and/or the slots 114 remain aligned with the holes in the PV modules.

In some embodiments, the module clamp 110 may include one or more width-wise flanges 117a and/or one or more length-wise flanges 117b (collectively referred to as "flanges 117") that extend horizontally from one or more lateral sides 116 of the module clamp 110. The flanges 117 may include flat and/or curved portions of the lateral sides 116 that extend horizontally from the lateral sides 116 in a width-wise direction 118. The flanges 117 may facilitate distributing stress experienced by the module clamp 110 and increase the load that the module clamp 110 may carry (e.g., increase the maximum weight of the PV module that may be mounted on the PV module mounting system 100). In these and other embodiments, the flanges 117 may or may not extend around the perimeter of the module clamp 110. For example, the width-wise flanges 117a may not be present and extending in a length-wise direction from the ends 111 of the module clamp 110. As another example, the length-wise flanges 117b may extend in the length-wise direction from the ends 111, but the length-wise flanges 117b may not be connected to and continuous with respect to the width-wise flanges 117a. In these and other examples, having the flanges 117 not extending around the perimeter of the module clamp 110 and/or only extending in the width-wise direction 118 may reduce the material stress experienced by the module clamp 110 caused by the weight of a PV module coupled to the module clamp 110 and/or caused by external environmental factors such as wind, snow, or other such factors. For example, in some embodiments, the length-wise flanges 117b may begin at the end 111a and proceed to the bottom surface 119 that interface with the torque tube, and may not extend through the portion of the module clamp 110 corresponding to the bottom surface 119 that interface with the torque tube, and the length-wise flanges 117b may begin again after the portion of the module clamp 110 corresponding to the bottom surface 119 that interface with the torque tube and continue on to the end 111b. While illustrated as being horizontal, it will be appreciated that the flanges 117a/b may be slightly offset from horizontal, such as at 60°, 70°, 80°, 85°, among others.

Modifications, additions, or omissions may be made to the module clamp 110 without departing from the scope of the disclosure. For example, the designations of different elements in the manner described is meant to help explain concepts described herein and is not limiting. Further, the module clamp 110 may include any number of other elements or may be implemented within other systems or contexts than those described.

Figure 2A:
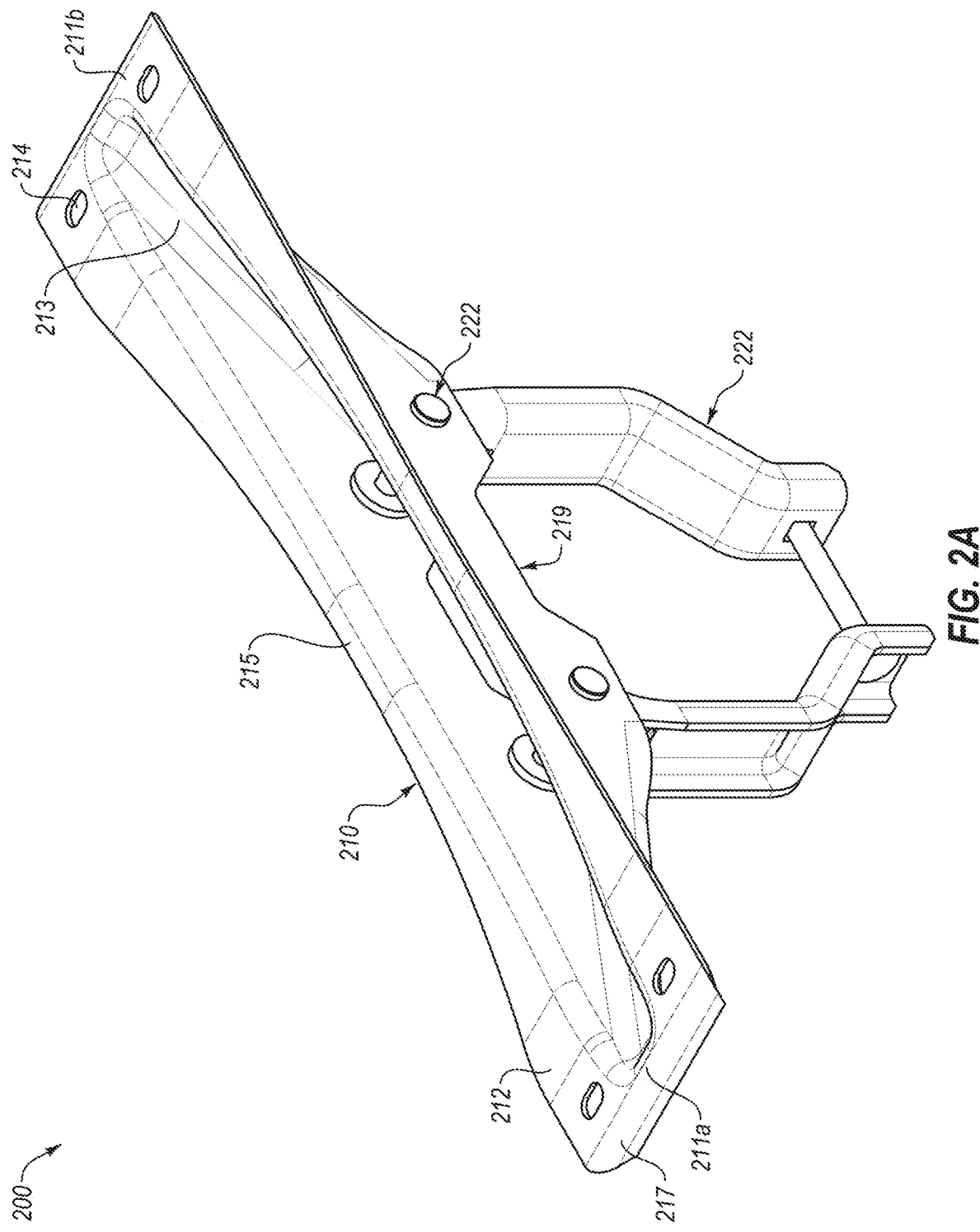
FIG. 2A is an isometric view of a second example embodiment of a PV module mounting system, according to at least one embodiment of the present disclosure.
Figure 2B:
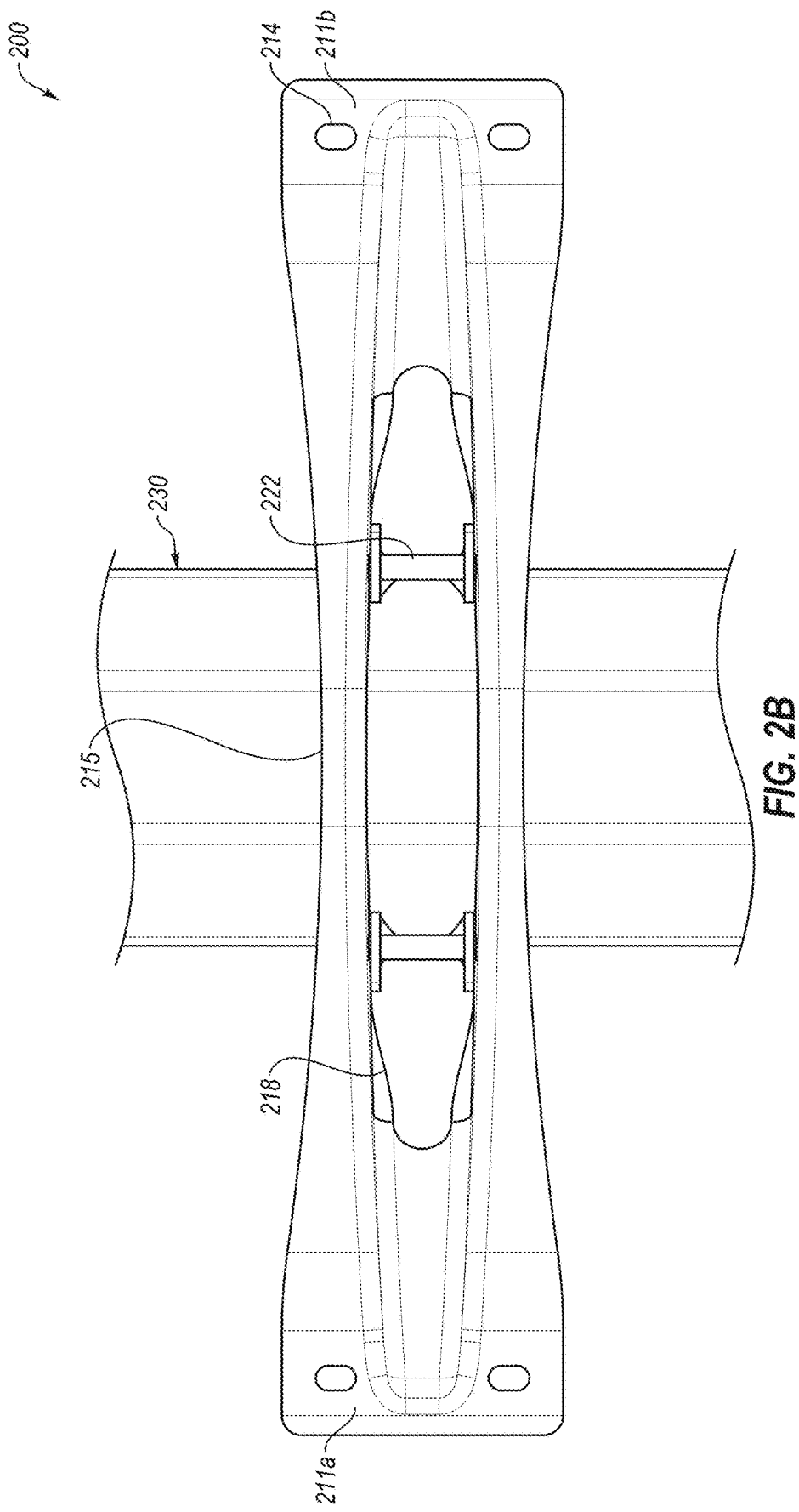
FIG. 2B is a top-down view of the second example PV module mounting system of FIG. 2A, according to at least one embodiment of the present disclosure.

FIGS. 2A-2C illustrate different views of a second example embodiment of a PV module mounting system 200 according to at least one embodiment of the present disclosure. FIG. 2A is an isometric view of the second example embodiment of the PV module mounting system 200 according to at least one embodiment of the present disclosure. FIG. 2B is a top-down view of the second example embodiment of the PV module mounting system 200 according to at least one embodiment of the present disclosure. FIG. 2C is a side view of the second example embodiment of the PV module mounting system 200 according to at least one embodiment of the present disclosure.

The PV module mounting system 200 may include a module clamp 210 on which a PV module (not shown) may be mounted. The module clamp 210 may be coupled to a torque tube band 220 that is configured to circumscribe a torque tube 230 in which rotation of the torque tube 230 causes a corresponding rotation of the torque tube band 220 and a corresponding tilting of the module clamp 210 and the PV module coupled to the module clamp 210.

A mounting surface 212 of the module clamp 210 that interfaces with the PV module may include a rectangular or a substantially rectangular shape that includes a first end 211a and a second end 211b (collectively referred to herein as "ends 211") and a central section 215. In some embodiments, the module clamp 210 may include a channel 213 that extends from the first end 211a to the second end 211b or substantially from the first end 211a to the second end 211b. The channel 213 may increase in depth as the channel 213 approaches the central section 215 of the module clamp 210 so that the ends 211 may include shallower heights than the central section 215 where the channel 213 is the deepest. The central section 215 of the module clamp 210 may be more rigid and therefore capable of taking greater stress loads than the ends 211 because the central section 215 is taller than either of the ends 211.

In some embodiments, the module clamp 210 may be shaped so that the ends 211 are positioned at a higher level than the central section 215 and a side profile of the module clamp 210 includes a bowed shape from the first end 211a to the second end 211b, such as shown in FIG. 2C. The bowed shape of the module clamp 210 may increase the stress load the module clamp 210 may be capable of handling and providing structural support for the PV module coupled to the module clamp 210.

As described above in relation to the slots 114 of the module clamp 110 in relation to FIGS. 1A-1C, the ends 211 of the module clamp 210 may include one or more slots 214. The slots 214 may be aligned with one or more slots or other fastening features of the PV module to facilitate coupling of the PV module to the mounting surface 212 of the module clamp 210. In these and other embodiments, coupling the PV module to the module clamp 210 may cause a bottom surface of the PV module to interface with the ends 211 of the module clamp 210 while forming a gap between the bottom surface of the PV module and a bowed portion 216 above the central section 215 of the module clamp 210.

In some embodiments, the module clamp 210 may include one or more flanges 217 in which each flange 217 extends from an edge of the module clamp 210, such as from the width-wise edges at the ends 211 of the module clamp 210. Additionally or alternatively, the flanges 217 may extend from the length-wise edges of the module clamp 210. Like the flanges 117 described in relation to the module clamp 110 of FIG. 1, the flanges 217 may facilitate distribution of forces experienced by the module clamp 210, which may increase the maximum allowable weight that may be carried by the PV module mounting system 200. In some embodiments, the flanges 217b may correspond to a bottom surface 219 that corresponds to the interface between the module clamp 210 and the torque tube.

In some embodiments, the module clamp 210 may include a cutout section 218 in the channel 213 and one or more pivot fasteners 222 that span at least a width of the cutout section 218. The cutout section 218 may be included in the module clamp 210 to facilitate manufacturing of the module camp 210 as described in relation to a flat pattern sheet 310 and a method 400 with respect to FIGS. 3 and 4, respectively. The pivot fasteners 222 may span the width of the cutout section 218 to provide axes about which a torque tube band 220 may rotate.

Modifications, additions, or omissions may be made to the module clamp 210 without departing from the scope of the disclosure. For example, the designations of different elements in the manner described is meant to help explain concepts described herein and is not limiting. Further, the module clamp 210 may include any number of other elements or may be implemented within other systems or contexts than those described. For example, the module clamp 210 may include a tab similar or comparable to the tabs 113 of FIGS. 1A-1C proximate the ends 211a/21b.

Figure 3:
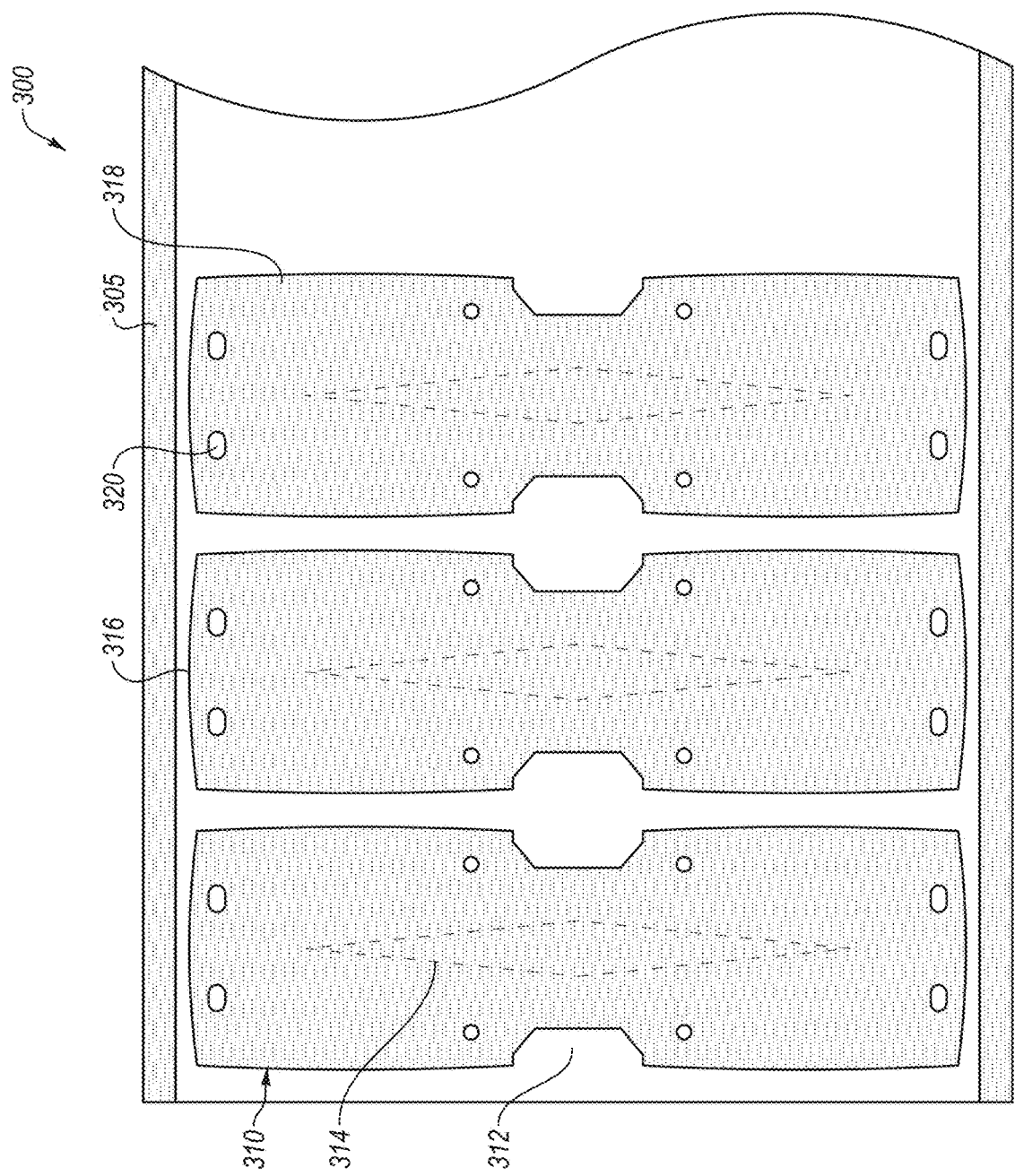
FIG. 3 illustrates a flat pattern shape that may be used to form an example PV module mounting system in a manufacturing process, according to at least one embodiment of the present disclosure

FIG. 3 illustrates one or more flat pattern sheets 310 that may be used to form module clamps used in PV module mounting systems via a die stamping process 300 or other manufacturing process, according to at least one embodiment of the present disclosure. In some embodiments, the flat pattern sheets 310 may be used to form the module clamp 110 and/or the module clamp 210 as described in relation to FIGS. 1A-1C and 2A-2C, respectively. The flat pattern sheets 310 may include one or more cutout portions 312 so that a module clamp formed from a given flat pattern sheets 310 includes a clearance section configured to interface with a torque tube. For example, as illustrated in FIG. 3, each of the cutout portions 312 may include a trapezoidal or semi-hexagonal shape, which may facilitate interfacing a module clamp formed from the flat pattern sheets 310 with a torque tube having a circular, square, oval, hexagonal, octagonal, nonagonal, or other cross-section shape. In these and other embodiments, the cutout portions 312 may be located in any position to facilitate the interfacing of the module clamp with the torque tube. For example, the cutout portions 312 may be located further towards either end of the flat pattern sheets 310.

The die stamping process 300 may include a sheet coil 305 that may be cut into one or more of the flat pattern sheets 310. Each of the flat pattern sheets 310 may be input to the die stamping process 300, which may be a progressive die stamping procedure that is configured to form one or more features of a module clamp in a sequential process. In some embodiments, the die stamping process 300 may involve punching one or more slots 320 into each of the flat pattern sheets 310 in one or more steps in which each step may be performed by one or more sheet-metal processing machines. Additionally or alternatively, a channel 314 may be stamped or cut into the flat pattern sheet 310 that may correspond to the cutout section 218 of FIGS. 2A-2C. In these and other embodiments, the die stamping process 300 may involve bending, folding, cutting, otherwise modifying the flat pattern sheets 310, or some combination thereof in one or more steps with each step being performed by one or more sheet-metal processing machines.

An example of the die stamping process 300 may include feeding the sheet coil 305 to a first machine that cuts the sheet coil 305 to form one or more of the flat pattern sheets 310. In some embodiments, cutting the sheet coil 305 to form a given flat pattern sheet 310 may involve cutting the sheet coil 305 a first distance along a length of the sheet coil 305 to form width-wise sides 316 of the given flat pattern sheet 310 and a second distance along a width of the sheet coil 305 to form length-wise sides 318 of the given flat pattern sheet 310. The first distance that the sheet coil 305 is cut along its length may correspond to a size of the given flat pattern sheet 310 along its width-wise sides 316, and the second distance may correspond to a size of the given flat pattern sheet 310 along its length-wise sides 318.

Each of the flat pattern sheets 310 may be processed by one or more second machines that are each configured to punch out or otherwise form one or more of the slots 320. Additionally or alternatively, the second machines may each be configured to cut one or more openings through the flat pattern sheets 310, such as the cutout section 218 included in the module clamp 210 of FIGS. 2A-2C. The flat pattern sheets 310 including the slots 320 may be processed by one or more third machines that are each configured to bend the flat pattern sheets 310 to form module clamps, such as the module clamp 110 or the module clamp 210. In this and other examples, the module clamps may be fed to one or more fourth machines that are each configured to modify the module clamp to form one or more features of the module clamp, such as the flanges 117 of the module clamp 110 and/or the flanges 217 of the module clamp 210.

While an example is provided of one order of operations to manufacture a module clamp, it will be appreciated that these operations may be performed in varying order. For example, the flat pattern sheets 310 may be folded first and then have features cut out after the flat pattern sheet 310 is folded. As another example, the flat pattern sheet 310 may have features cut out and then folded afterwards. Additionally or alternatively, such operations may be iteratively repeated or occur in any order. For example, one fold may be made, followed by one feature being cut out, followed by an additional fold being made, followed by another feature being cut out, etc.

Figure 4:
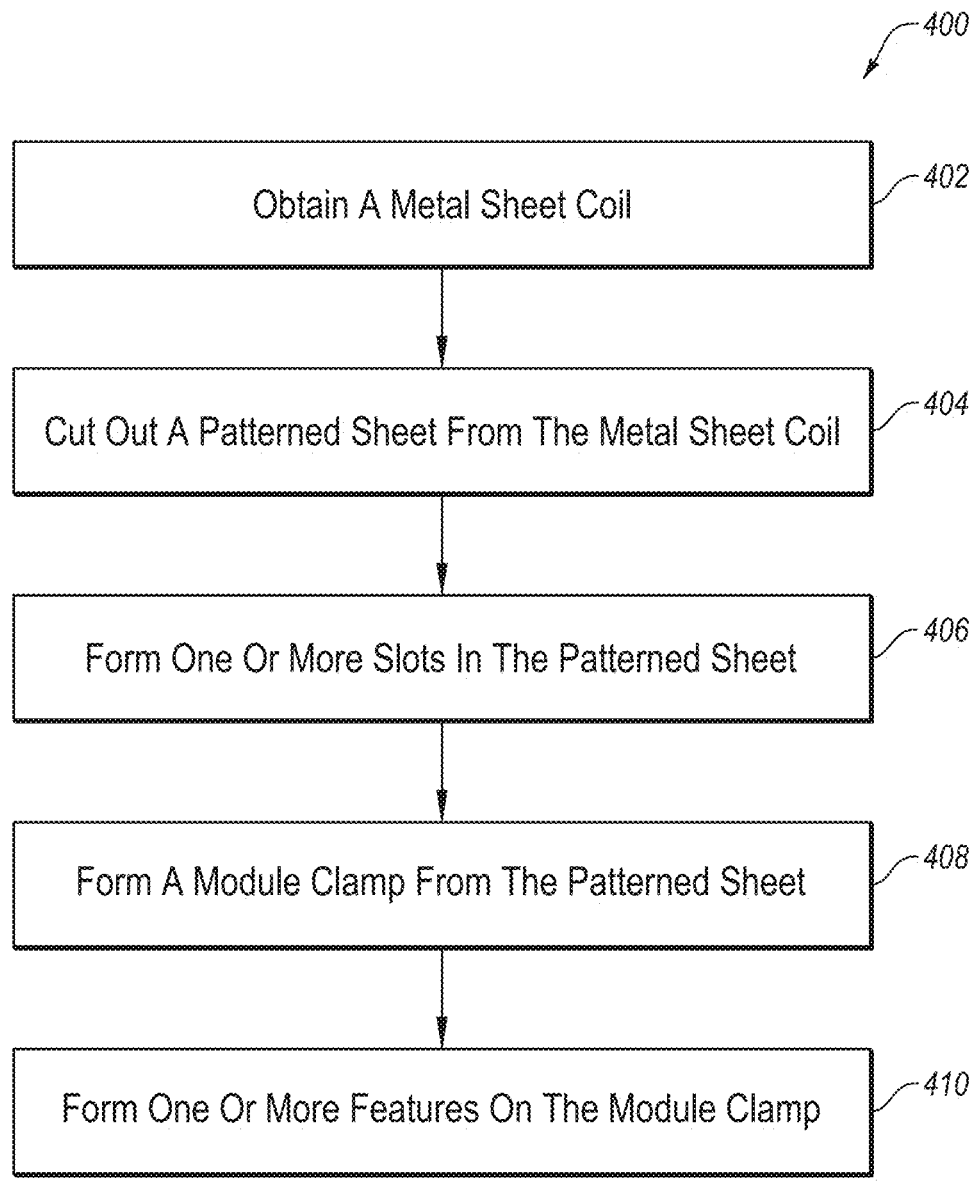
FIG. 4 is a flowchart of an example method of fabricating a PV module mounting system, according to at least one embodiment of the present disclosure.

FIG. 4 is a flowchart of an example method 400 of fabricating the PV module mounting system according to at least one embodiment of the present disclosure. The method 400 may be performed by any suitable system, apparatus, or device. For example, any of the first machines, the second machines, the third machines, the fourth machines, and/or any other apparatuses that may be implemented in a die stamping process like the die stamping process 300 of FIG. 3 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a metal sheet coil may be obtained. In some embodiments, the metal sheet coil may be a galvanized steel sheet, a carbon steel, an aluminum-steel alloy, or any other types of metal. The metal sheet coil may be included in a roll of sheet metal that is continuously fed to a metal-cutting apparatus included in a progressive die stamping process. In some embodiments, because of the simplified manufacturing disclosed in the present disclosure, the metal sheet coil may include a pre-treated (e.g., galvanized) material such that post-manufacturing treatment may not be required.

At block 404, a patterned sheet may be cut out from the metal sheet coil. The patterned sheet may be cut from the metal sheet coil, such as by the metal-cutting apparatus into which the roll of sheet metal is fed, and a rectangular or substantially rectangular patterned sheet may be cut from the metal sheet coil. The patterned sheet may include a substantially rectangular shape with one or more cutouts, such as the cutout portions 312 as described in relation to FIG. 3, to facilitate interfacing a module clamp formed from the patterned sheet with a corresponding torque tube having a cross-sectional shape that corresponds to the shape of the cutouts. In some embodiments, one or more edges of the metal sheet coil may be used as corresponding edges of the patterned sheet to decrease the amount of cutting used to form the patterned sheet. For example, the patterned sheet may be cut from the metal sheet coil such that a length of the patterned sheet is the same as or similar to a width of the metal sheet coil, and a width of the patterned sheet corresponds to a segment of the length of the metal sheet coil when the metal sheet coil is fed into the metal-cutting apparatus from the metal sheet coil's width-wise edge. Additionally or alternatively, the patterned sheet may be cut from the metal sheet coil as an individual shape as depicted in relation to the flat pattern sheet 310 of FIG. 3.

At block 406, one or more slots may be formed in the patterned sheet. In some embodiments, the slots may be formed as part of the progressive die stamping process being applied to the metal sheet coil and the patterned sheet. Thus, the slots may be formed simultaneously with the formation of the patterned sheet by cutting the metal sheet coil as described in relation to block 404 or may be performed in a sequential processing step before or after the formation of the patterned sheet. Additionally or alternatively, the slots may be formed in the patterned sheet in a given processing step subsequent to formation of the patterned sheet as described in relation to block 404 in which the given processing step simultaneously includes formation of a module clamp as described in relation to block 408.

Additionally or alternatively, forming the slots in the patterned sheet may include forming one or more cutout features. For example, a length-wise slit may be cut into the center of the patterned sheet to create an opening in one or more surfaces of a module clamp formed from the patterned sheet, such as the cutout section 218 of the module clamp 210 as described in relation to FIGS. 2A-2C.

At block 408, a module clamp may be formed from the patterned sheet. In some embodiments, forming the module clamp may involve folding, bending, or otherwise changing the shape of the patterned sheet. In these and other embodiments, the shape of the module clamp may be changed by bending one or more portions of the patterned sheet. Additionally or alternatively, the patterned sheet may be pressed against a contoured template block such that the patterned sheet is imprinted with the general shape of the contoured template block and/or the shapes of any protruding features included with the contoured template block. For example, the patterned sheet may be placed flush against a rectangular template block that includes a shorter width than the width of the patterned sheet. The patterned sheet may be wrapped around the rectangular template block in response to being pressed against the rectangular template block, which may form a module clamp having a rectangular channel shape.

At block 410, one or more features may be formed on the module clamp. In some embodiments, the features formed on the module clamp may include additional or alternative bends in one or more portions of the module clamp, such as to form the flanges 117 and/or the flanges 217 of FIGS.

1A-1C and/or FIGS. 2A-2C, respectively. Additionally or alternatively, the features formed on the module clamp may include protruding features, such as the tabs 113 of FIGS. 1A-1C, and/or additional cutout slots. In these and other embodiments, the features may be formed on the module clamp as part of the progressive die stamping process in which the module clamp formed at block 408 is passed through one or more forming/processing stations in which a forming tool at each of the forming stations is configured to form one or more of the features.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described. Additionally or alternatively, one or more of the operations may be combined or performed simultaneously with others. The operations of the method 400 may be performed in any order. For example, in some embodiments one or more of the cutting or forming steps 404 and/or 406 may occur before or after one or more of the forming steps 408 and/or 410. For example, the forming steps 408 and/or 410 may be performed, followed by the cutting step 404 and the forming step 406 in any order. Additionally or alternatively, such steps may be iteratively performed, such as forming, cutting, forming, cutting, or any other combination of such steps.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A module clamp for use in a photovoltaic module mounting system, the module clamp comprising:
    a first side wall having a top edge and a bottom edge;
    a second side wall having a top edge and a bottom edge;
    a bottom surface that couples at least portions of the bottom edges of the first and second side walls to form an elongated body;
    a first mounting surface having an inner edge and an outer edge, the inner edge being coupled to at least a portion of the top edge of the first side wall, wherein the first mounting surface includes end sections and a central section that is positioned between the end sections; and
    a second mounting surface having an inner edge and an outer edge, the inner edge being coupled to at least a portion of the top edge of the second side wall, wherein the second mounting surface includes end sections and a central section that is positioned between the end sections;
    wherein:
        the bottom edges of the first and second side walls and a portion of the bottom surface define an enclosed opening that is configured to surround at least a portion of a torque tube, and
        a distance between the outer edges of the first and second mounting surfaces at their central sections is less than a distance between the outer edges of the first and second mounting surfaces at their end sections.

2. The module clamp of claim 1, wherein:
    the first side wall includes end sections and a central section that is positioned between the end sections,
    the second side wall includes end sections and a central section that is positioned between the end sections, and
    heights of the first and second side walls at their central sections are larger than heights of the first and second side walls at their end sections.

3. The module clamp of claim 1, wherein the ends of the first and second mounting surfaces includes one or more holes that are configured to be aligned with one or more holes in a photovoltaic module.

4. The module clamp of claim 1, wherein the first and second side walls, the first and second mounting surfaces, and the bottom surface are made of galvanized steel.

5. The module clamp of claim 1, wherein the first and second side walls, the first and second mounting surfaces, and the bottom surface are made from a single unitary piece of material.

6. The module clamp of claim 1, wherein the bottom edges of the first and second side walls at the central section define portions of at least 2 sides of a polygonal shape.

7. The module clamp of claim 1, wherein the first and second side walls and the bottom surface define a channel.

8. A module clamp for use in a photovoltaic module mounting system, the module clamp comprising:
- a first side wall having a top edge and a bottom edge;
- a second side wall having a top edge and a bottom edge;
- a bottom surface that couples at least portions of the bottom edges of the first and second side walls to form an elongated body;
- a first mounting surface having an inner edge and an outer edge, the inner edge being coupled to at least a portion of the top edge of the first side wall, wherein the first mounting surface includes end sections and a central section that is positioned between the end sections; and
- a second mounting surface having an inner edge and an outer edge, the inner edge being coupled to at least a portion of the top edge of the second side wall, wherein the second mounting surface includes end sections and a central section that is positioned between the end sections;

wherein:
- the bottom edges of the first and second side walls at the central section define portions of at least 2 sides of a polygonal shape, and
- a distance between the outer edges of the first and second mounting surfaces at their central sections is less than a distance between the outer edges of the first and second mounting surfaces at their end sections.

9. The module clamp of claim 8, wherein:
the first side wall includes end sections and a central section that is positioned between the end sections,
the second side wall includes end sections and a central section that is positioned between the end sections, and
heights of the first and second side walls at their central sections are larger than heights of the first and second side walls at their end sections.

10. The module clamp of claim 8, wherein the ends of the first and second mounting surfaces includes one or more holes that are configured to be aligned with one or more holes in a photovoltaic module.

11. The module clamp of claim 8, wherein the first and second side walls, the first and second mounting surfaces, and the bottom surface are made of galvanized steel.

12. The module clamp of claim 8, wherein the first and second side walls, the first and second mounting surfaces, and the bottom surface are made from a single unitary piece of material.

13. The module clamp of claim 8, wherein the first and second side walls and the bottom surface define a channel.

14. A module clamp for use in a photovoltaic module mounting system, the module clamp comprising:
- a first side wall having a top edge and a bottom edge;
- a second side wall having a top edge and a bottom edge;
- a bottom surface that couples at least portions of the bottom edges of the first and second side walls to form an elongated body;
- a first mounting surface having an inner edge and an outer edge, the inner edge being coupled to at least a portion of the top edge of the first side wall, wherein the first mounting surface includes end sections and a central section that is positioned between the end sections; and
- a second mounting surface having an inner edge and an outer edge, the inner edge being coupled to at least a portion of the top edge of the second side wall, wherein the second mounting surface includes end sections and a central section that is positioned between the end sections;

wherein:
- the first side wall includes end sections and a central section that is positioned between the end sections,
- the second side wall includes end sections and a central section that is positioned between the end sections,
- heights of the first and second side walls at their central sections are larger than heights of the first and second side walls at their end sections, and
- a distance between the outer edges of the first and second mounting surfaces at their central sections is less than a distance between the outer edges of the first and second mounting surfaces at their end sections.

15. The module clamp of claim 14, wherein the ends of the first and second mounting surfaces includes one or more holes that are configured to be aligned with one or more holes in a photovoltaic module.

16. The module clamp of claim 14, wherein the first and second side walls, the first and second mounting surfaces, and the bottom surface are made of galvanized steel.

17. The module clamp of claim 14, wherein the first and second side walls, the first and second mounting surfaces, and the bottom surface are made from a single unitary piece of material.

18. The module clamp of claim 14, wherein the bottom edges of the first and second side walls at the central section define portions of at least 2 sides of a polygonal shape.

19. The module clamp of claim 14, wherein the bottom edges of the first and second side walls and a portion of the bottom surface define an enclosed opening that is configured to surround at least a portion of a torque tube.

20. The module clamp of claim 14, wherein the first and second side walls and the bottom surface define a channel.

* * * * *